Jan. 19, 1971   F. LOUZIL ET AL   3,555,917
BELT SHIFTING DEVICE
Filed Feb. 14, 1969
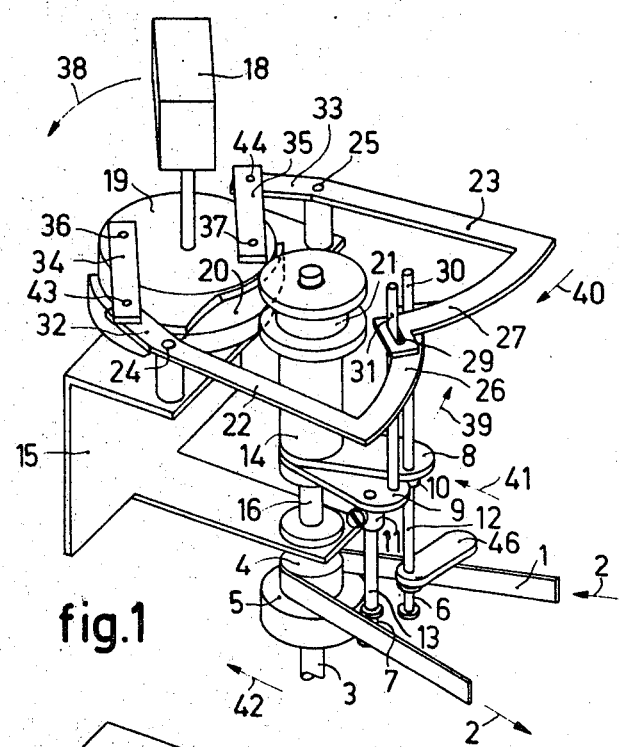
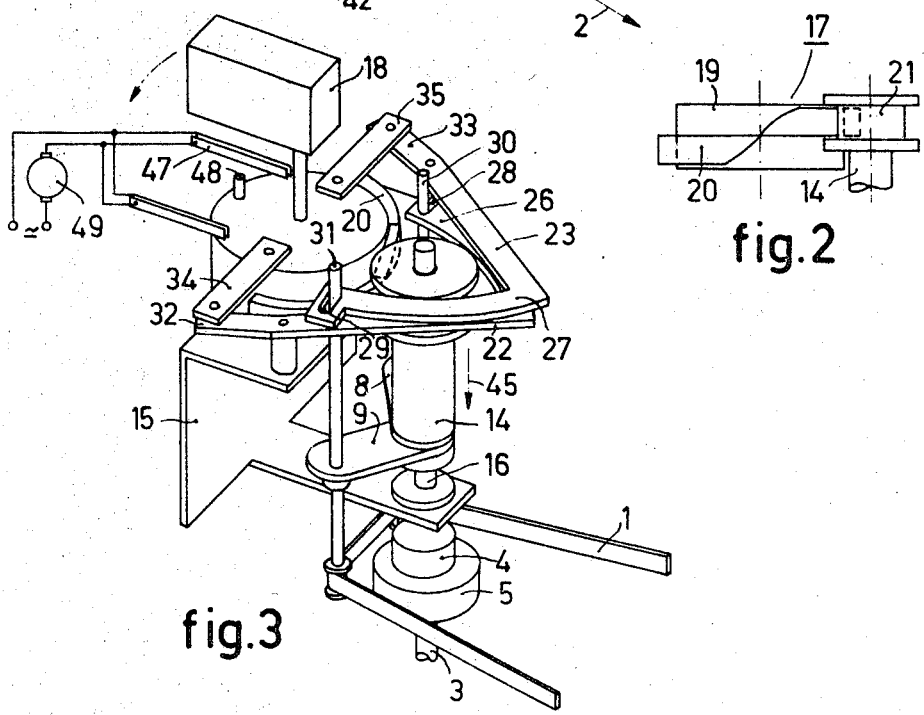
INVENTORS
FRIEDRICH LOUZIL
GERHARD HABELT
BY
AGENT

United States Patent Office 3,555,917
Patented Jan. 19, 1971

3,555,917
BELT SHIFTING DEVICE
Friedrich Louzil and Gerhard Habelt, Vienna, Austria, assignors to U.S. Philips Corporation, New York, N.Y., a corporation of Delaware
Filed Feb. 14, 1969, Ser. No. 799,285
Claims priority, application Austria, Feb. 19, 1968, A 1,528/68
Int. Cl. F16h 7/22
U.S. Cl. 74—242.3                                                8 Claims

ABSTRACT OF THE DISCLOSURE

A device for catching and shifting a flat belt between axially arranged pulleys for use in a recording and/or playback apparatus. Control member rollers positioned adjacent the belt are attached to movable shafts for catching the belt and removing same from the pulley. A rotatable disc having a guide path (cam) operationally connected with the control member rollers shifts the belt to another pulley.

---

The invention relates to a device for shifting a belt between axially arranged pulleys of a recording and/or playback apparatus. A control member for catching and shifting the belt from one pulley to the other, is provided which can be moved by means of an operating member. Such devices for shifting a belt having a circular or square cross section are known. Shifting a flat belt having a rectangular cross section, however, cannot be accomplished with the known devices, since during shifting the belt will be caused to turn approximately 90° in which case a flat belt could no longer run on the pulley.

It is an object of the invention to provide a simple and particularly reliable device for shifting a flat belt between pulleys in a recording and/or playback apparatus. The invention comprises control members consisting of rollers rotatably mounted on an arm and located on the slack part and driving part of the belt. The arm is pivotally located on a sleeve which can be moved along a fixed shaft, which is approximately aligned with the shaft of the pulleys, over a distance equal to the distance between the two pulleys. A guide path, or cam, and guide follower, or cam follower, which constitutes a connection between the sleeve and a rotatably operable disc, is provided for moving the sleeve. A lever which is swingable around a fixed shaft is associated with each arm, one end of the lever being constructed as a catch for the arm and the other end is connected to a coupling rod in a pivot. The rod is pivotally connected to the disc at a point of engagement so that the points of engagement of the two coupling rods on the disc are located diametrically opposite to each other and, when the disc is rotated, a region is traversed in which the said points of engagement and the pivots of the coupling rods with the levers are located on a straight line. The guide path (cam) and the follower will then have displaced the sleeve in that region. When shifting a flat belt from the pulley to the other in this manner, the belt is tilted from the pulley on which it is running at a given instant, by means of the rollers, brought parallel to itself at the level of the other pulley and laid around it. During such a shift, said belt experiences no deformation whatsoever, with the exception of some elongation. The shifting therefore occurs with obsolute reliability which is particularly important because, a serious disturbance of the apparatus would occur if the belt were to run off the pulley. Furthermore, this device is capable of operating equally as well with either driven or a stationary belt.

The position of the rollers on the arms with respect to the travel of the belt is preferably adjustable. As a result, each roller can be precisely positioned with respect to the belt, so that it catches same reliably. In order to avoid oscillations of the belt during shifting, it has been found desirable to provide, on one side of the roller and near the driving part of the belt, a finger which extends beyond the plane in which the belt is travelling.

It has further been found desirable to provide a switch which is controlled by the disc, and in the closed position only when the disc is in an extreme position, for turning on the driving motor by which the belt is driven. The disc will only be in an extreme position when a shift of the belt from one pulley to the other has been completely carried out. Actually, if the belt, which is driven by the motor, is lifted from a pulley, the motor load decreases as a result of the decoupling of the part to be driven, so that the speed of the belt might increase to an undesirable value. The switch means provided for above will prevent this by deactivating the driving motor during the short time of shifting the belt.

In order that the invention may be readily carried into effect, it will now be described in greater detail, by way of example, with reference to the accompanying drawing, in which:

FIG. 1 is a perspective view of the apparatus according to the present invention for shifting a belt from a first pulley in a recording and/or playback apparatus to a second pulley, the apparatus being shown in an operating condition in which the belt lies around one of the pulleys;

FIG. 2 is a structural detail of the device shown in FIG. 1, and

FIG. 3 is a view similar to that shown in FIG. 1, the apparatus being in an intermediate position during shifting of the belt from one pulley to the other.

Referring now to FIG. 1, a flat belt 1 having a rectangular cross section is driven in the direction of the arrow 2 by a motor or flywheel (not shown). This belt is used for driving a shaft 3 when acting in cooperation with either of two pulleys 4 and 5 provided coaxially thereon and having different diameters. The belt can be laid on either pulley for driving the shaft. The shaft 3 forms part of a recorder and/or playback apparatus (not shown). The driving of a record carrier may be effected either directly or indirectly by the shaft. In the first case the record carrier and supports, such as a flywheel for stabilizing its running, are driven directly by the shaft 3. In the second case a separate driving device, such as another driving shaft or a spool disk, may be driven by the shaft 3, for example, through drivers for further speed variations. The recording and/or playback apparatus is provided with two important operating capabilities by the fact that shaft 3 can be driven by two different pulleys. The first possibility is that the shaft 3 can be driven by the two pulleys at two different speeds so that, as is known, the record carrier can be moved arbitrarily at two different speeds. The second, likewise known, operating possibility consists in an apparatus which can be switched between 50 and 60 c./s. mains frequency and which can hence be connected to two different mains in that a record carrier is always moved at a constant speed because the pulleys are constructed so that they exactly compensate for the occurring speed variations as a result of the different mains frequencies.

In both cases a device is required which is capable of reliably shifting the belt from one pulley to the other. The control member and the means required for shifting the belt will now be described in detail.

As shown in FIG. 1, the belt 1 is around the pulley 4. The device for shifting the belt 1 from pulley 4 to pulley 5, or conversely, comprises a control member having two rollers 6 and 7, which are arranged within the travel of the belt near the driving and slack parts of the belt.

Arms 8 and 9, respectively, to which shafts 12 and 13, respectively, are secured in sleeves 10 and 11, respectively, so as to be slidable and fixable by a screw, serve to support said rollers. Hence, by displacing the shafts, the rollers are adjustable relative to the travel of the belt. The arms 8 and 9 in turn are rotatably mounted on a sleeve 14, which is slidable along a shaft which is rigidly secured to a support 15 of the device and hence is fixed. In the apparatus the support is provided so that the shafts 16 and 3 are in approximate alignment with each other.

For displacing the sleeve 14 on the shaft 16, a device 17 is provided which is shown in detail in FIG. 2. This device consists of a disc 19 which is pivotally attached to the support 15 and can be rotated by means of an operating member 18. The disc 19 has a cam (guide path) 20 on its circumference which cooperates with a groove 21 in the sleeve 14 which acts as the cam follower. Upon rotating the disc 19, the sleeve 14 is displaced in its longitudinal direction by an amount determined by the shape of the cam (guide path) 20. The cam 20 is constructed so that the sleeve is displaced over a distance which corresponds to the mutual distance between the two pulleys. However, the rollers 6 and 7 are also displaced over the same distance, that is to say, they are brought from the level of one pulley to that of the other.

Furthermore, levers 22 and 23, respectively, are associated with arms 8 and 9, respectively, and are pivotally connected to fixed shafts 24 and 25, respectively, on the support 15. The ends 26 and 27, respectively, of each lever are constructed as a catch for the arm in question for which purpose it has elongated holes 28 and 29, respectively. Pins 30 and 31, attached to arms 8 and 9, respectively, extend through holes 28 and 29, respectively. The other ends 32 and 33, respectively, of each lever are pivotally secured to the disc 19 through coupling rods 34 and 35, respectively; the points of engagement 36 and 37, respectively, of the two coupling rods on the disc being located diametrically opposite to each other and approximately symmetrically with the guide path 20 on the disc. When the belt 1 is to be shifted from pulley 4 to pulley 5, the operating member 18 is rotated in the direction of the arrow 38. As a result of this the disc 19 is rotated in the same direction and hence the coupling rods 34, 35 which in turn rotate the levers 22, 23 in the direction of the arrows 39 and 40, respectively. The movement of the levers causes the arms 8, 9 to move circularly around the pulleys and thus causes the rollers 6, 7 to move in the direction of the arrows 41, 42 and so catch the belt and lift it from the pulley 4.

As soon as the coupling rods assume a position in which their points of engagement 36, 37 on the disc 19 and their pivots 43, 44 with the levers 22, 23 are on a straight line, the rollers will have removed the belt to a position farthest from the pulleys so that it also extends beyond the circumference of the largest pulley. This position is shown in FIG. 3. During this movement, however, the sleeve 14 is also displaced in the direction of the arrow 45 by means of the cam and the cam follower. As shown in the figure the cam (or guide path) is constructed so that the belt is first fully lifted from the pulley and only then are the rollers displaced in the direction of the arrow 45.

Upon further rotation of the disc 19 beyond the position shown in FIG. 3, the sleeve 14 is again displaced in the direction of the arrow 45, until the rollers have reached the level of the pulley 5. The direction of movement of the levers 22, 23 is then inverted under the action of coupling rods 34, 35, so that they are now rotated against the direction of the arrows 39, 40. As a result of this, however, the rollers 6 and 7 are also moved against the direction of the arrows 41, 42. As a result of this, the belt will finally engage the pulley 5. Moreover, the disc 19 can be moved somewhat farther until in a new extreme position, in which the levers 22, 23 again assume the position shown in FIG. 1, the rollers 6, 7 again being located within the travel of the belt. Herewith the shift of the belt is completed.

When the belt is to be reshifted from pulley 5 to pulley 4, the rollers 6, 7 will travel the same above-described path in the reverse direction when the operating member 18 is readjusted so that the belt is lifted from the pulley 5, brought at the level of the pulley 4 and laid around said pulley 4.

As appears from the above, the shifting of the belt is effected very accurately so that the device operates absolutely reliably.

It has proved of advantage to provide a belt guide near the roller and located on the driving side of the belt. The guide is operative when the roller has already released the belt. Such a guide may consist of a fork projecting beyond the travel of the belt beside the roller or may only consist of a finger on one side of the roller. This latter construction is shown in FIG. 1, in which the finger has reference numeral 46.

An additional feature (shown in FIG. 3) may be provided by which the belt driving motor 49 may be deactivated during the displacement of the belt from one pulley to the other.

A switch 47, which is controlled by means of a pin 48 attached to the disc 19, is used for switching on the current in the circuit of the motor 49. The switch will be closed and hence the motor will drive the belt only when the disk is in one of its extreme positions, i.e., when a shift of the belt between pulleys is complete. It can therefore be understood that during the shifting operation the belt will not accelerate above its normal speed. Actually, when the belt is lifted from a pulley, an increase of the number of rotations of said motor may result due to the removal of the drive 3, and consequent unloading of the motor.

What is claimed is:

1. A device for shifting a belt between pulleys axially aligned on a rotatable shaft in a recording and/or playback apparatus comprising a support member, a fixed shaft attached to said support member having its axis approximately aligned with the axis of said pulley shaft, a sleeve movably mounted on said fixed shaft for movement in the longitudinal direction over a distance equal to the distance between said pulleys, a pair of arms pivotally attached to said sleeve for rotational movement about the axis of said fixed shaft, a roller member rotatably connected with each of said arms, said rollers being located within the path of travel of the belt, one of said rollers being located adjacent the drive part of the belt and the other roller being located adjacent the slack part of the belt, said roller being operable for catching and shifting the belt from cooperation with one of said pulleys into cooperation with the other pulley, a disc pivotally attached to said support, an operating member attached to said disc for causing rotational movement thereof, a cam attached to the circumference of said disc, cam follower means attached to said sleeve and in cooperation with said cam for moving said sleeve in a longitudinal direction in response to the shape of the cam, lever means having a first and second end being pivotally attached at a point between said ends to said support, said first end of said lever means having means for connection with said arms, a pair of coupling rods being pivotally connected at one end thereof to pivot points on said second end of the lever means and being pivotally connected at the other end thereof to points of engagement on said disc, said points of engagement being located on said disc at diametrically opposite points, whereby when said disc is rotated by said operating member a region is traversed in which the pivot points and points of engagement are located on a straight line so that said levers will be caused to have rotated about its pivot on said support to its most extended position thereby causing said roller members carried on said arms to have lifted said belt from one of said rollers, and whereby said sleeve has been displaced in response to the rotation of the cam and cam follower means so as to move said belt carrying rollers between the pulleys.

2. The device according to claim 1 further comprising a shaft adjustably connected with each of said arms for carrying said roller members so that the position of the roller members with respect to said arms is adjustable.

3. The device according to claim 2 further comprising a finger mounted on one of said shafts for carrying said roller and located on the driving side of said belt, said finger extending beyond the plane of said belt for guiding the travel of said belt so as to avoid oscillations thereof during the shifting of the belt from one pulley to the other.

4. The device according to claim 1 further comprising switch means for controlling the operation of a motor for driving the belt, said switch means being located in proximity with said disc, and means attached to said disc for closing said switch means only when said disc is in one of its extreme positions so that said motor is only in its operative condition when the belt is in cooperation with one of said pulleys.

5. A device for shifting a belt between pulleys axially aligned on a rotatable shaft in a recording and/or playback apparatus comprising: a support, shaft means fixedly secured to said support, a sleeve mounted for slidable movement on said shaft, a pair of arms pivotally attached to said sleeve for movement about the longitudinal axis of said shaft means, control means, attached to said arms for lifting and shifting said belt from one pulley to the other, means for displacing the sleeve member an amount equal to the distance between pulleys so as to cause said arms to be displaced by an equal amount, whereby said control means will have been shifted so as to place said belt in position with the other pulley, operating means attached to said arms for causing said control means to engage and lift said belt from one of said pulleys, and an operating member attached to said displacing means for putting into operation said displacing means and said operating means.

6. The device according to claim 5 wherein said control means comprises a shaft adjustably attached to each of said arms, a roller member rotatably mounted on each of said shafts, said roller members being located within the path of travel of said belt, one of said roller members positioned adjacent the driving side of said belt and the other roller member positioned adjacent the slack side of said belt.

7. The device according to claim 6 wherein said means for displacing the sleeve comprises a disc pivotally attached to said support, a cam attached to said disc, cam follower means mounted on said sleeve for displacing the sleeve by an amount determined by the shape of said cam, said operating member being attached to said disc.

8. The device according to claim 7 wherein said operating means comprises a pair of levers pivotally attached to said support, said levers having a first end for connection with said arms, a pair of coupling rods pivotally connected at one end thereof to pivot points on the second end of each of said levers and being pivotally connected at the other end thereof to points of engagement on said disc, said points of engagement being located on said disc at diametrically opposite points whereby when said disc is rotated by the operating member said pivot points and said points of engagement will pass a position of being located on a straight line so that said levers cause the arms to which they are connected and their associated rollers to be fully extended so that said rollers will engage and fully lift said belt from one of said pulleys and whereby said sleeve will have been displaced by the cooperation between the cam and cam follower when pivot points and points of engagement are in a straight line so that the arms and roller members will have been displaced by an equal amount for causing the shifting of the belt from one pulley to the other.

References Cited
UNITED STATES PATENTS 2,162,968　6/1939　Phelps _____ 74—242.4

JAMES A. WONG, Primary Examiner

U.S. Cl. X.R.

74—242.7